(No Model.)  T. DUNCAN.  7 Sheets—Sheet 1.
ELECTRIC METER.

No. 604,464.  Patented May 24, 1898.

Fig. 1.

Witnesses
Samuel R. Bachtel.
Nora A. Duncan

Thomas Duncan Inventor
By his Attorneys Chapin & Denny (No Model.)

T. DUNCAN.
ELECTRIC METER.

Patented May 24, 1898.

Fig. 2.

(No Model.) 7 Sheets—Sheet 3.

T. DUNCAN.
ELECTRIC METER.

No. 604,464. Patented May 24, 1898.

Witnesses
Samuel R. Bachtel.
Nora A. Duncan

Thomas Duncan Inventor
By his Attorneys Chapin & Denny (No Model.)

T. DUNCAN.
ELECTRIC METER.

Patented May 24, 1898.

Witnesses
Samuel R. Bachtel
Nora A. Duncan

Thomas Duncan Inventor
By his Attorneys Chapin & Denny (No Model.) 7 Sheets—Sheet 7.

T. DUNCAN.
ELECTRIC METER.

No. 604,464. Patented May 24, 1898.

Witnesses
Samuel R. Bachtel
Nora A. Duncan

Thomas Duncan Inventor
By his Attorneys Chapin & Denny

UNITED STATES PATENT OFFICE.

THOMAS DUNCAN, OF FORT WAYNE, INDIANA.

ELECTRIC METER.

SPECIFICATION forming part of Letters Patent No. 604,464, dated May 24, 1898.

Application filed September 11, 1897. Serial No. 651,270. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in electric meters, more particularly to that class known as "integrating ampere hour or coulomb induction meters" for alternating currents.

The objects of my invention are, first, to provide an electric meter reliable and efficient in operation and adapted to secure an increased torque for a given expenditure of energy and to secure accuracy on small loads by having the least possible weight in the moving parts, thereby materially reducing the friction and inertia thereof.

Second. Another object is to provide a dust, insect, and moisture proof meter having such a simplicity of construction that the average central-station operator can take it apart for repairs and readily reassemble it, thus obviating the necessity for returning it to the maker in such an emergency or requiring skilled labor for this purpose.

Third. A further object is to provide an electric meter which can be efficiently employed on more than one frequency, thus adapting it for use in central stations which furnish currents of, say, sixty periods during the day for the accommodation of motor service and from one hundred and twenty-five to one hundred and forty periods during the night for lighting.

In certain prior applications—to wit, Serial Nos. 642,212, 647,303, 647,304, 647,305, and 647,809—I have shown and described methods of measuring alternating currents by employing more than two lines of magnetization to produce rotation in the armature. In said applications the rotary armature is a closed secondary or seat of induced currents, is of a non-magnetic quality, and is acted upon by two sets of energizing-fields, one of which is located within and one without the said armature.

My present improvement comprises such a construction and arrangement of the motive parts as to set up a line of magnetization in phase with the line electromotive force and also setting up two other intersecting lines of magnetization differing in phase from the former line and lagging behind it, the said three lines of magnetization combining to form a resultant which actuates the rotary metallic armature arranged within all of the actuating-coils.

The principal novel features of my present invention are, first, the relative arrangement of the rotary metallic armature and the energizing-coils by which a higher efficiency is secured; second, a construction by which the meter is applicable to alternating currents of various frequencies without any special calibrating devices.

In the accompanying drawings, in which similar reference-numerals indicate like parts throughout the several views.

Figure 1:
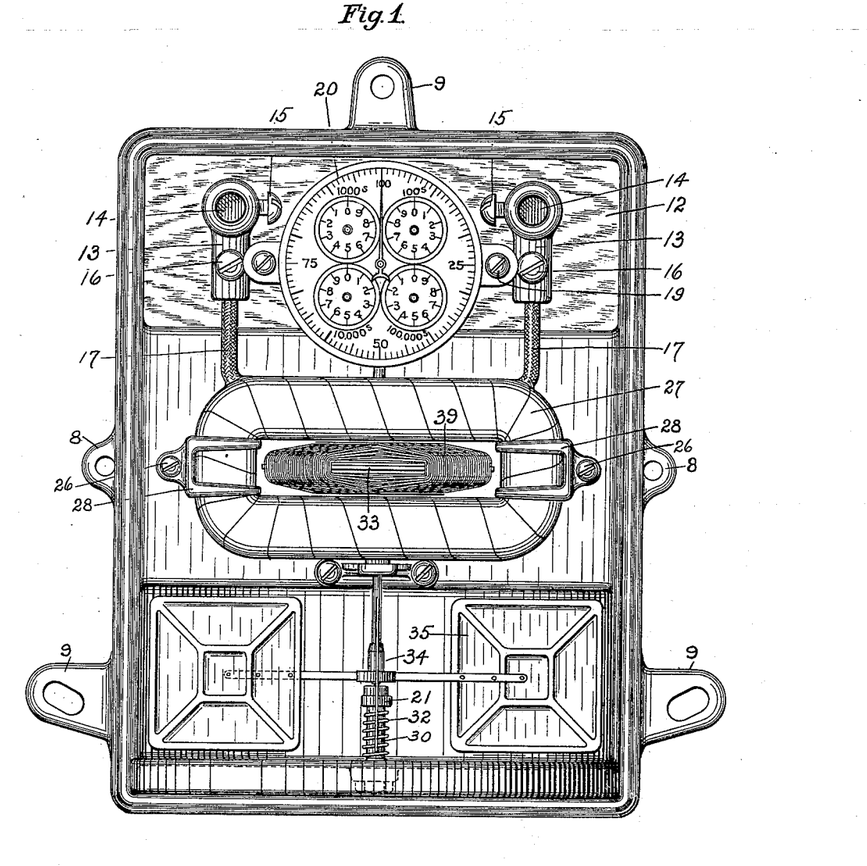
Figure 1 is a front elevation of my invention, showing the relative arrangement of the operative parts.
Figure 3:
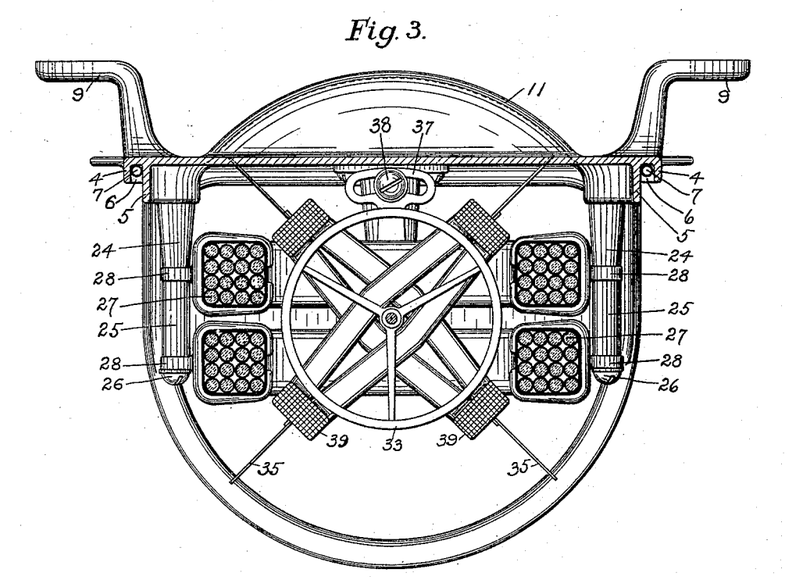
Fig. 3 is a plan view of the same in horizontal section through the motive part.

The operative parts of my improved meter are mounted upon an L-shaped metallic bracket 1, having an integral back 2 and a base 3 and provided with the parallel flanges 4 and 5, forming a narrow and continuous groove or recess 6 between them adapted to receive a suitable packing, such as rubber tubing or soft cord 7, Fig. 3, against which the adjacent edges of the meter-cover is tightly fitted, thereby making it dust, moisture, and insect proof. The said bracket 1 is also provided with the apertured lateral ears 8, to which the meter-cover is rigidly secured, and with the lateral apertured lugs 9, by means of which it is fixed or suspended in any desired position. The said bracket 1 is also provided with the integral rearwardly-projecting pockets 10 and 11, open upon their forward faces, the former adapted to contain a proper insulating wooden block 12, to which is fixed the binding-posts 13, having the insulated opening 14 and the set-screw 15, by means of which the meter is connected with the outside circuit, Fig. 1. The binding-posts 13 are also provided with the set-screws 16, which secure the terminals 17 of the series coils. The said pocket 11 is semicircular in contour, Fig. 3, adapted to admit the rotary fans, hereinafter described, and thereby make the meter more compact. To the back 2 of said bracket 1, midway the sides thereof, is detachably mounted by proper holding-screws the upwardly-curved and forwardly-projecting arm 18, to which the registering-train 20 of ordinary construction is rigidly secured by means of the screws 19. The forward end of the arm 18 has a proper vertically-adjustable bearing for the upper end of the armature-spindle 22, having a proper worm 23 therein adapted to mesh with a proper gear-wheel (not shown) in said train in the usual manner.

To the back 2 and near the sides thereof are rigidly secured in any proper manner the forwardly-projecting horizontal arms or studs 24, to the outer end of which is secured the tubes 25 by means of the set-screws 26. To these tubes the opposite ends of the series coils are firmly secured by means of the clamps 28, Fig. 2. By this construction the said coils can readily be detached for repairs and as conveniently reassembled.

Upon the lower face of base 3 is arranged a pendent box 29, in which is mounted by a screw-threaded connection the lower end of the jewel-post 30, secured therein by a jam-nut 31. On this jewel-post is loosely mounted a coil-spring 32 to hold nut 21 in position when in use or for shipment. The upper screw-threaded end of said post 30 has a proper jewel-bearing and an adjusting-nut 21, adapted to raise the armature-spindle 22 up out of contact with the jewel-bearing, as in case of shipment or storage. To the armature-spindle thus secured in position between the said upper bearing 21 and the said jewel-bearing is rigidly secured the armature 33, Figs. 2 and 3, and the hub 34 of the four-winged fan 35, Fig. 2, which in its revolution passes through the said semicircular pocket 11.

To the back of the bracket 2, midway the side thereof, is secured by proper holding-screws the forwardly-projecting horizontal arm 36, on which is arranged an adjusting-lever 37, whose rear slotted end, Fig. 3, is secured by a set-screw 38 and on whose forward end is mounted the two shunt or volt coils 39. The shunt-coils are wound at right angles to each other and have their axes inclined to the axis of the series coils 27. These fine-wire coils 39 are arranged within the said series coils, Fig. 3, are supported in position by said arm 36, and can readily be adjusted by means of said lever 37. The speed of the meter is thus regulated by varying the angle of the axes of said shunt-coils to the axis of the series coils by adjusting the lever 37 and securing it in the desired position by means of the set-screw 38. The armature-spindle passes through a suitable opening in the free end of said arm 36 and said lever 37 and has a short tube 40 loosely arranged thereon whose lower end rests upon said lever 36 and on whose upper end the shunt-coils are rigidly fixed. Where the wires from the outside mains enter the meter, they pass through the insulated bushings 41 in the rear face of the said pocket 10, Fig. 2.

Figure 4:
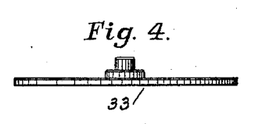
Fig. 4 is a detail of one form of armature.
Figure 5:
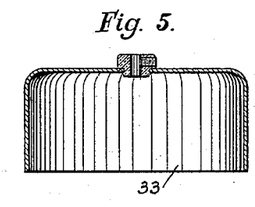
Fig. 5 is a vertical transverse section of a modified form of cylindrical armature closed at the top.
Figure 6:
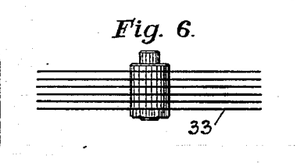
Fig. 6 is a detail of another form of armature consisting of a plurality of thin metallic disks fixed in parallel relation upon a supporting-limb.
Figure 7:
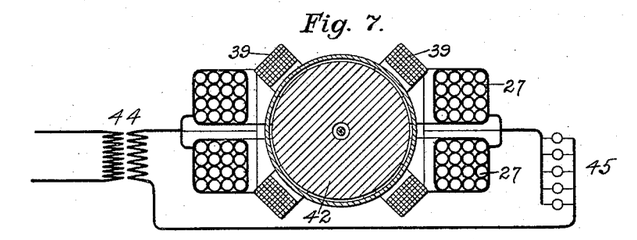
Fig. 7 is a transverse section of the motive part of my improvement as applied to a single-phase system of distribution, showing the series and shunt coils in multiple to each other and also showing the use of an iron core 42 within the armature.

The armature employed in my improved meter may be in the form of a ring and made of iron, Fig. 3, having a supporting-spider; in the form of a disk having a central hub, Fig. 4; in the form of an inverted cup and made of aluminium or other suitable metal, Fig. 5; or it may be made of a plurality of thin iron rings or disks properly secured to a central hub, Fig. 6. I have found that a laminated iron core 44 can be placed inside of that form of armature shown in Fig. 5 with good results.

Figure 8:
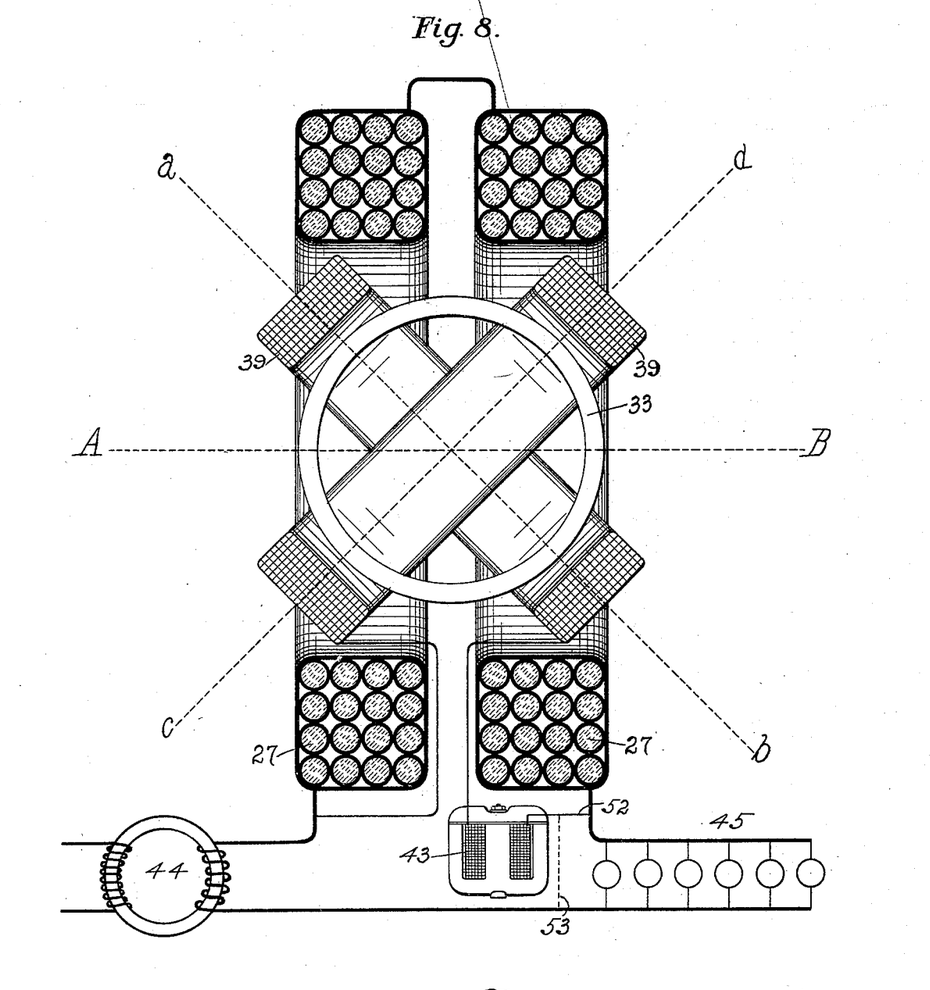
Fig. 8 is a vertical section of the motive part, showing by dotted lines the intersecting axes of magnetization of the energizing-coils, resulting in rotation of the inclosed armature.

Referring now to Fig. 8, when an impulse of current traverses the circuit it passes through the series coils 27 and produces a line or axis of magnetization A B. Since the terminals of the fine-wire coil 39 are connected in multiple or shunted around the terminals of said series coils, there will also be an impulse of current through these; but on account of the greater number of turns they will possess a greater self-induction, thus causing the current through them to lag considerably behind that of the series coils and producing the axes $a\,b$ and $c\,d$, which are inclined at an angle to A B. Therefore as the magnetism represented by the line A B is commencing to decrease in strength the magnetism represented by the lines $a\,b$ and $c\,d$ will be increasing in strength, and the line $c\,d$ will attract A B, while the line $a\,b$ will repel it. In this manner an increase of torque is obtained, as in nearly all forms of induction-motor meters only two lines of magnetization are employed and in which the one reducing or dying out is attracted by the one increasing in strength, thereby producing a rotary or shifting field. In the present improvement, however, it will be seen that the increase in the efficiency is obtained by combining with this attraction between the two lines mentioned an additional force or torque producing agent in the form of a third line of magnetization, repelling the one which is dying out toward the other which is attracting it. In other words, the line A B is attracted by the line $c\,d$ and repelled by $a\,b$. This construction has proven to give twice the efficiency over similar forms of meters in which two lines of magnetization only are employed.

Figure 2:
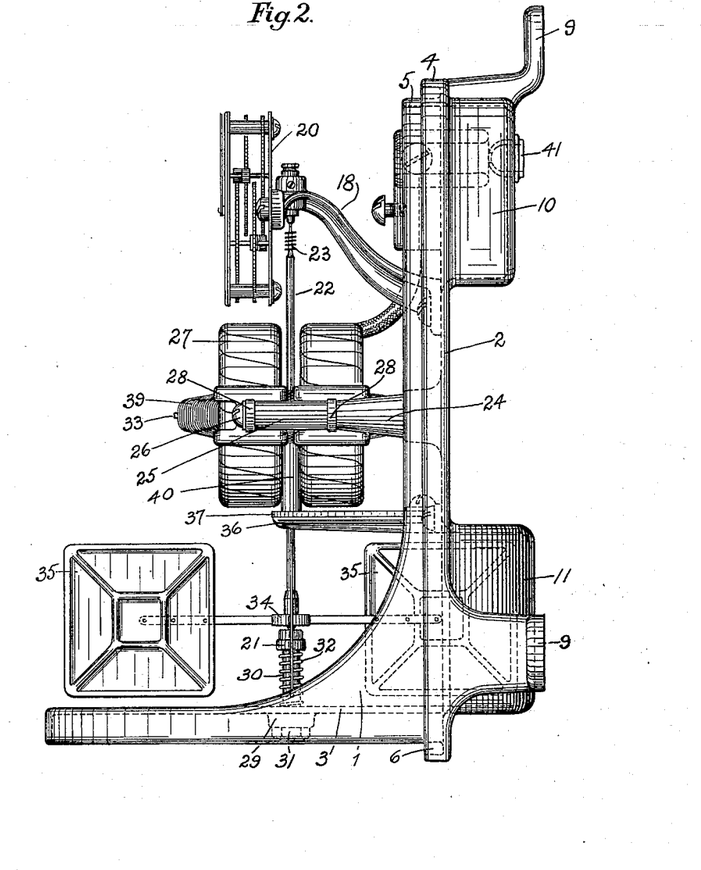
Fig. 2 is a side view of the same.

Since the current through the series coils 27 and that through a shunt or fine-wire coil 39 vary in the same ratio, it is obvious that the torque produced will vary as the square of the current flowing in the circuit. This being the case a form of retardation or drag must be used in which it will vary as the square of the revolutions, in order that the resulting speed of the meter will vary directly as the current passes through it. To accomplish this end, I employ the four-winged fans 35, the operation of which is well understood by those skilled in the art. These fans 35, as shown in Fig. 2, have ribs punched in them to secure the required rigidity. In case the fine-wire coils 39 have not sufficient self-induction to make them lag behind the series coils 27, as desired, an impedance-coil 43 may be employed, as is shown in Fig. 8. A transformer 44 or other source of current and incandescent-lamps 45 are shown in Fig. 8 diametrically.

Figure 9:
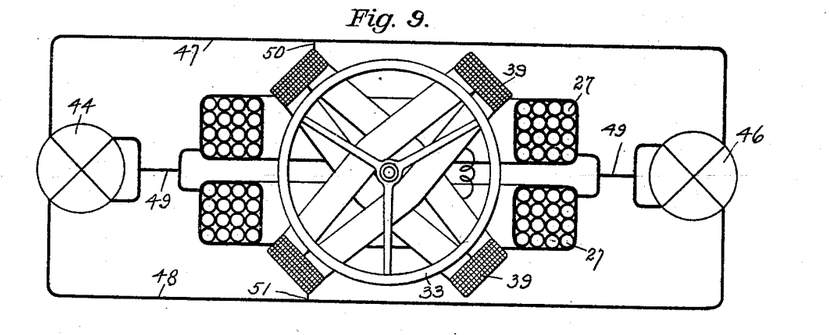
Fig. 9 is a transverse section of the motive part, showing diagrammatically the application in a wattmeter to a two-phase system in which the generator has two mains connected to a proper translating device.
Figure 10:
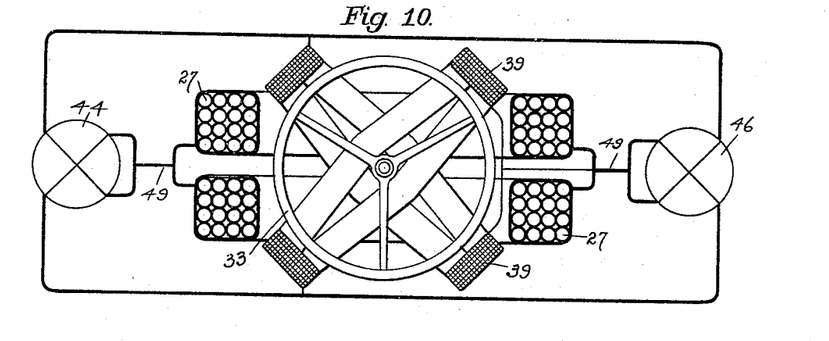
Fig. 10 is a similar view with the series coils similarly connected in circuit, but the shunt-coils have their inner terminals joined together and connected to the return-lead.
Figure 11:
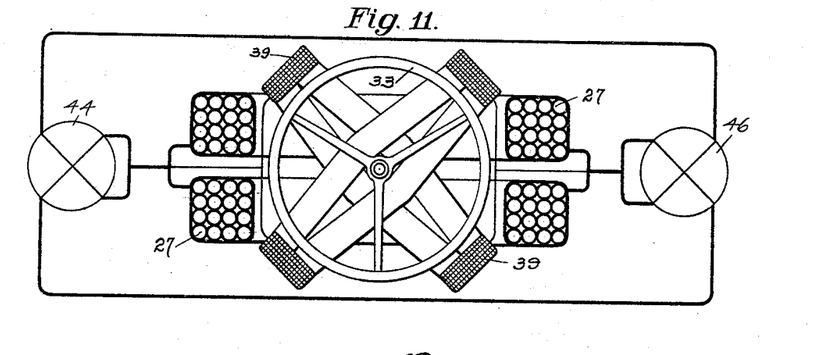
Fig. 11 is a similar view and arrangement of parts with the shunt-coils connected in parallel to each other and shunted around the terminals of the series coils.
Figure 12:
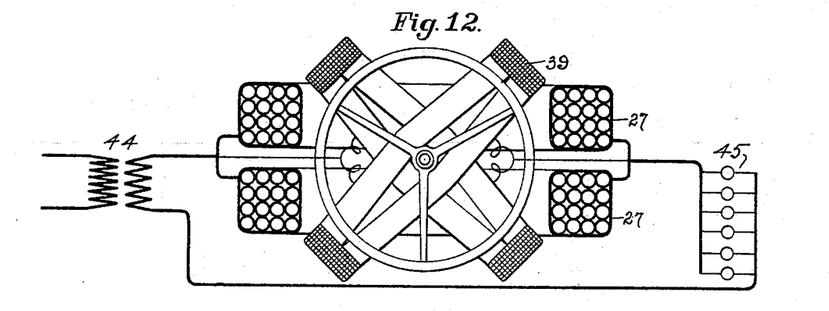
Fig. 12 is a similar view of Fig. 11, excepting that it is connected to a single-phase system.
Figure 13:
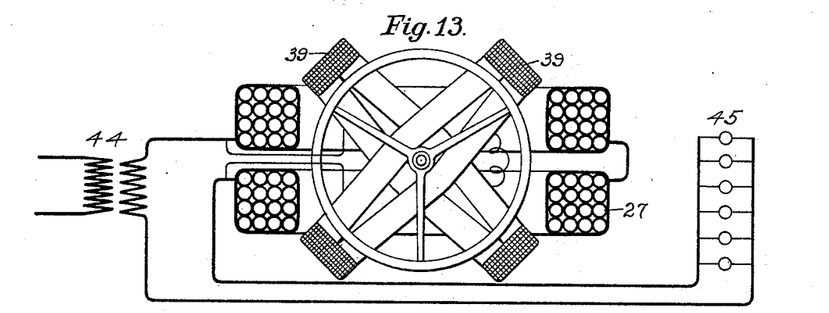
Fig. 13 shows the connectings for a single-phase coulomb-meter, in which the series coils are connected in series with each other.
Figure 14:
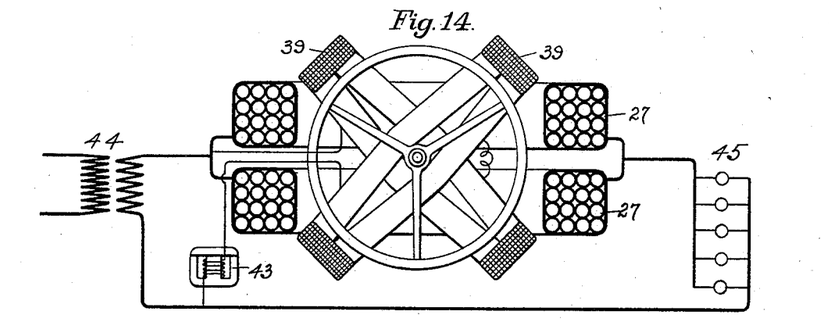
Fig. 14 is a similar view showing diagrammatically the meter connected up for a single-phase system in which the series coils are connected in the main circuit and the terminals of the shunt-coils are connected upon opposite sides of the circuit after one of the said terminals has passed through an impedance-coil.
Figure 15:
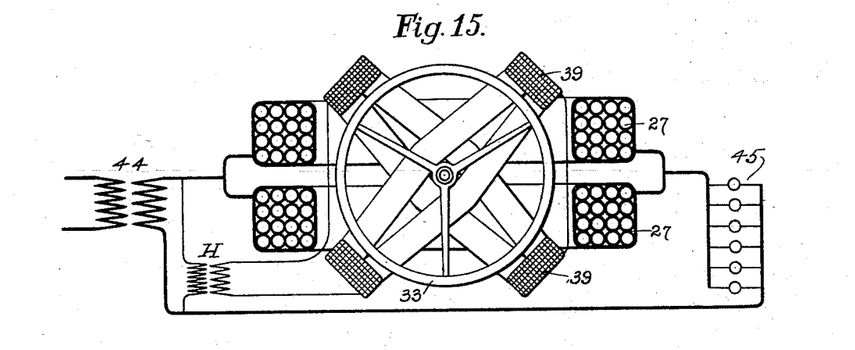
Fig. 15 is a similar view and application in which the shunt-coils are energized by means of a transformer H.
Figure 16:
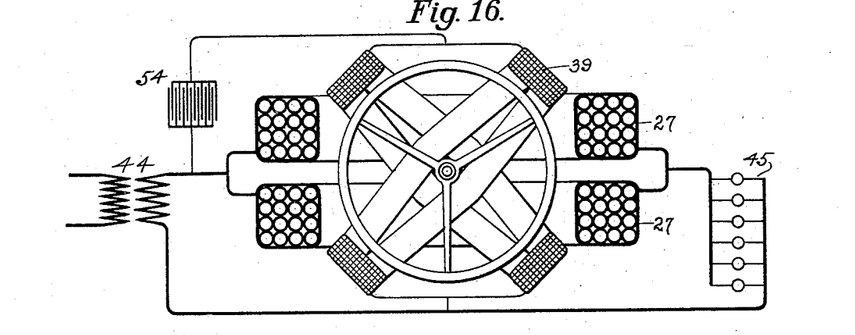
Fig. 16 is a similar view and application in which the shunt or volt coils are energized by a current produced by a condenser shown diagrammatically at 54.
Figure 17:
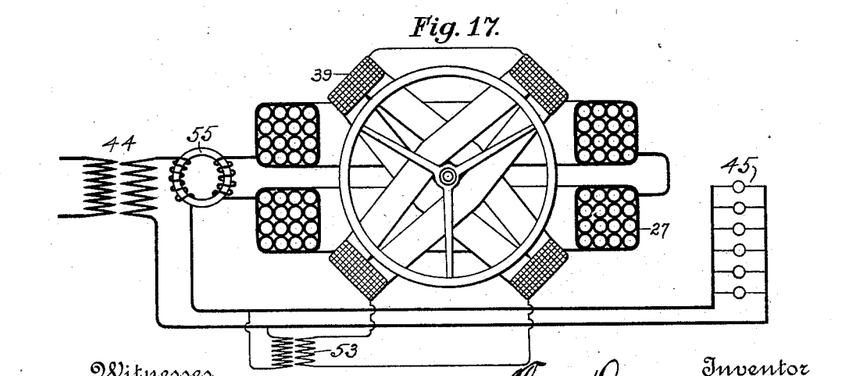
Fig. 17 is a similar view showing its application to a single-phase system in which the series-coils are connected in circuit with the secondary of the series transformer at 55 and the shunt-coils are energized by a multiple transformer at 53.

In Fig. 9 I have shown a diagram of connections involving its application as a wattmeter to a two-phase system, in which the generator 44 has two outer mains 47 and 48, connected to a motor or other translating device 46. The current supplying the series coils 27 of the meter are connected in the return-circuit 49, as shown. The fine-wire coils 39 are connected to the two outer mains 47 and 48 at the points 50 and 51.

It will be noted in Fig. 8 that if the wire 52 from the impedance-coil be connected upon the other side of the circuit, as shown in dotted line 53, the connection is suitable for a wattmeter.

What I desire to secure by Letters Patent is—

1. The herein-described method of measuring alternating electric currents which consists in setting up or establishing a shifting field of magnetism from three intersecting lines or axes of magnetization, and adapted to actuate a rotatable armature in a motor-meter arranged within the energizing-coils producing said lines of magnetization.

2. The process of producing rotation in a revoluble metallic armature for motor-meters, arranged within the energizing-coils, which consists in setting up a shifting field from three intersecting lines or axes of magnetization two of which are sychronous in phase but differ in phase from the third, and bisecting said armature, as described.

3. The herein-described method of measuring alternating currents by producing a shifting field from three intersecting lines or axes of magnetization, bisecting and adapted to actuate a rotatable metallic armature arranged within the energizing-coils, one of said lines or axes being set up by the series coils, the remaining lines or axes of non-synchronous phase being set up by the shunt-coils at an angle to each other and being inclined to the line or axes of the series coils.

4. In a motor-meter the combination of the series coils connected in series in the main line and conveying the current to be measured; a pair of shunt-coils arranged within said series coils; and a revoluble metallic armature mounted within said shunt-coils.

5. In an electric meter the combination of the series coils conveying the current to be measured; a plurality of shunt or volt coils arranged within said series coils and adapted to set up intersecting lines or axes of magnetization whose phase is non-synchronous with that set up by the said series coils; and a revoluble armature arranged within said shunt-coils adapted to be actuated by intersecting lines of magnetization set up by the said series coils and said shunt-coils.

6. In an electric meter the series coils conveying the current to be measured; the shunt-coils adjustably mounted within said series coils; the revoluble armature arranged within said shunt-coils and provided with a metallic core 42, and adapted to be actuated by intersecting lines of magnetization set up by said series and shunt coils.

7. The combination of the series coils conveying the current to be measured; the shunt-coils adjustably mounted within said series coils, at an angle to each other and to the series coils; the revoluble armature arranged within said shunt-coils, and adapted to be actuated by said series and shunt coils; and means for varying at pleasure the inclination of said shunt-coils to each other.

8. The combination of meter-supporting bracket 1 having upon its rear face a closed fan-receiving recess or pocket 11, for the purpose specified and provided upon its front face with a continuous cover-receiving groove or recess; and a dust-proof cover adapted to snugly fit said recess, all substantially as described.

Signed by me, at Fort Wayne, Allen county, State of Indiana, this 8th day of September, 1897.

THOMAS DUNCAN.

Witnesses:
ADELAIDE KEARNS,
DUDLEY CAMPBELL.